United States Patent [19]
Koza et al.
[11] Patent Number: 4,892,322
[45] Date of Patent: Jan. 9, 1990

[54] LOUVER GASKET

[76] Inventors: Coleman L. Koza, 321 Laclie Street, Orillia, Ontario, Canada, L3V4P2; Lawrence J. Koza, 42 Cairns Boulevard, Barrie, Ontario, Canada, L4M4S7

[21] Appl. No.: 180,752

[22] Filed: Apr. 12, 1988

[30] Foreign Application Priority Data

Mar. 23, 1988 [CA] Canada .................................. 562227

[51] Int. Cl.[4] .............................................. F16J 15/00

[52] U.S. Cl. .................................. 277/207 R; 52/288; 98/121.1

[58] Field of Search .................... 52/288, 287, 35, 474, 52/776, 473; 98/29, 121.1, 121.3, 121.2; 49/475, 479; 277/207 R, 212 C, 212 P, 227, 12

[56] References Cited

U.S. PATENT DOCUMENTS

| | | | |
|---|---|---|---|
| 1,713,648 | 5/1929 | Feinberg et al. | 98/121 X |
| 2,227,581 | 1/1941 | Henderson | 52/287 |
| 2,303,864 | 12/1942 | Reasor | 52/35 |
| 2,618,821 | 11/1952 | Corn | 52/473 |
| 3,011,422 | 12/1961 | Scallon | 52/473 |
| 3,216,164 | 11/1965 | Stillman | 52/287 |
| 3,271,232 | 9/1966 | Moore | 52/288 |
| 3,284,957 | 11/1966 | Landis | 49/495 |
| 3,408,250 | 10/1968 | Finefrock | 52/288 |
| 4,497,134 | 2/1985 | Meyer et al. | 49/91 |
| 4,497,137 | 2/1985 | Nelson | 49/495 |

*Primary Examiner*—William A. Cuchlinski, Jr.
*Assistant Examiner*—Jeffrey J. Hohenshell
*Attorney, Agent, or Firm*—Rogers, Bereskin & Parr

[57] ABSTRACT

A gasket for use on ventilation louvers of buildings. The gasket fits snugly over the sidewall of the ventilation louver and has a circumferential radially inwardly facing concave side surface terminating in a narrow lip which presses against the louver sidewall. The gasket also has a circumferential concave rear surface which presses against siding or the like which abuts against the louver sidewall, to provide some degree of seal. The concave surfaces also help maintain the gasket's orientation. The gasket position can be manually adjusted on the louver sidewall to suit different siding thicknesses, or the gasket can be removed and discarded.

7 Claims, 2 Drawing Sheets

LOUVER GASKET

FIELD OF INVENTION

This invention relates to a gasket used on ventilation louvers for houses and other buildings, and to the combination of a gasket and ventilation louver.

BACKGROUND OF INVENTION

Ventilation louvers are commonly used on the gable ends of houses and other buildings. The purpose of such louvers is to permit ventilation of attics and other spaces in buildings by providing a set of screened openings through which air can circulate. Typically louvers are made in a variety of geometric shapes, with shape selection being largely a matter of aesthetic preference. Usually the louvers are made of blow molded plastic (but sometimes of wood), normally with a polygonal sidewall (of desired shape) with a radially outwardly extending circumferential flange at the bottom of the sidewall.

Installation of a louver in a building wall involves cutting a hole in the underlying sheeting material, and then nailing or screwing the louver flange in place on the perimeter of the hole. Next, the wall (including the louver flange) is covered with a desired exterior face material which can be brick, aluminum siding, vinyl siding or other material.

When a siding material is used, the siding must be cut at the construction site so that it abuts against the sidewall of the louver. Since the cuts are never perfect, this typically leaves gaps between the ends of the siding and the sidewall of the louver. Such gaps are unsightly and in addition wind, rain and snow can blow into them, causing leakage. Therefore the gaps must be covered.

In current practice, siding edge strips are cut to length and secured to the sidewall of the louver to cover the cut ends of the siding. This is time consuming and difficult, and therefore expensive. Caulking is also sometimes used, but frequently caulking cannot fill and cover the spaces involved, and in addition caulking tends to shrink and discolour and is therefore unsatisfactory.

SUMMARY OF THE INVENTION

The invention therefore provides a gasket which snugly encircles the sidewall of the louver and can be slid along the sidewall to cover tightly the cut ends of the siding or other material which abuts against the sidewall of the louver. If the facing material used on the wall is brick instead of siding, then the gasket can still be used, or alternatively, it can be discarded.

Accordingly the present invention in one of its aspects provides a gasket for use with a ventilation louver of the kind having a base and a sidewall, said gasket having a body arranged in a closed polygonal loop with an open interior for receiving said louver, said body having a generally concave circumferential radially inwardly facing surface adapted to encircle and press against the side of said louver, a generally concave circumferential rearwardly facing surface adapted to press against a construction material covering the base of said louver, a circumferential front surface, said front surface being at least partly concave, said circumferential front surface and said circumferential radially inwardly facing surface meeting in a thin radially inwardly extending circumferential lip, said lip being adapted to press sealingly against said sidewall, said circumferential radially inwardly facing surface and said circumferential rearwardly facing surface meeting at an acute angle.

In another aspect the invention provides in combination, a ventilation louver comprising a polygonal sidewall having a bottom and a top, a flange extending radially outwardly from the bottom of said sidewall and encircling said sidewall, a set of louver slats extending across the top of said sidewall, and a gasket fitted on and encircling said sidewall, said gasket normally being of circumference slightly less than that of said sidewall and thereby exerting tension against and being fitted snugly on said sidewall, said gasket having a generally concave circumferential radially inwardly facing surface facing and pressing against said sidewall and having a generally concave circumferential rearwardly facing surface adapted to press against a construction material covering said flange of said louver, said circumferential radially inwardly facing surface and said circumferential rearwardly facing surface meeting at an acute angle so that when said flange is covered by said construction material, said gasket may be pushed rearwardly over said sidewall of said louver to a position in which said rear surface presses against said construction material.

Further objects and advantages of the invention will appear from the following description, taken together with the accompanying drawings.

DESCRIPTION OF PREFERRED EMBODIMENT

The drawings show a typical ventilation louver generally indicated at 10 and which may be of any desired polygonal shape, e.g. round, semi-circular, hexagonal, rectangular or the like. In the example shown, the shape selected is hexagonal.

Figure 3:
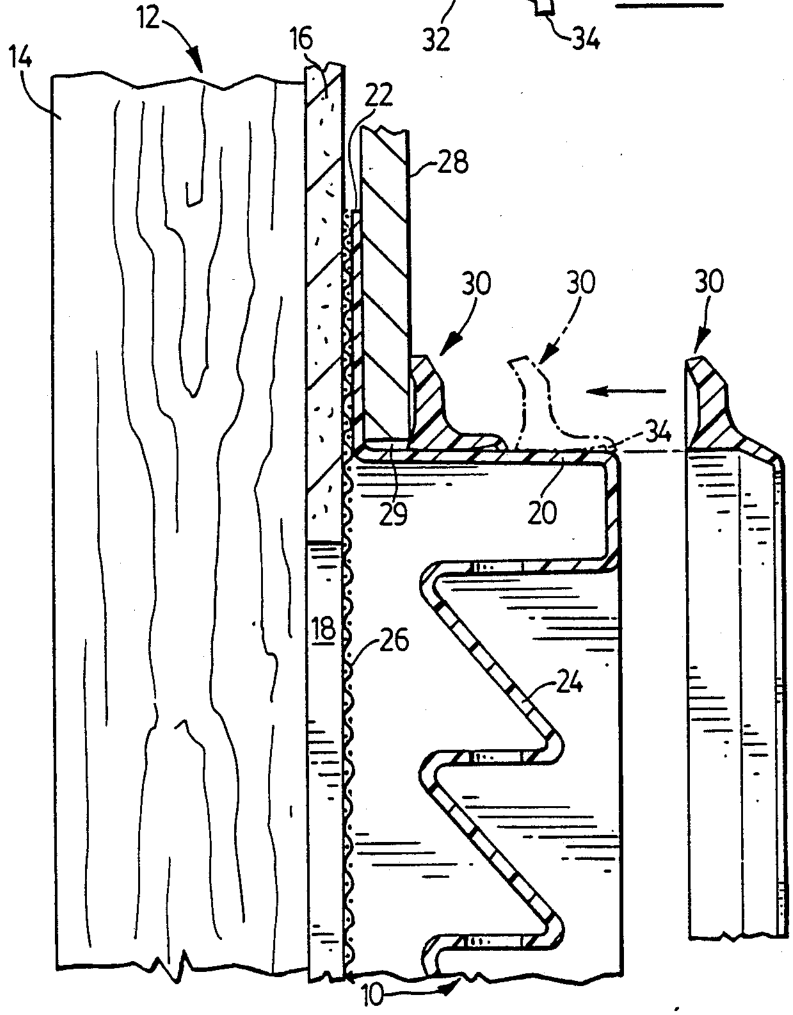
FIG. 3 is a cross-sectional view showing a portion of a louver in place on a wall and bearing a gasket according to the invention.

The ventilation louver 10 is usually installed on a wall indicated at 12 in FIG. 3. The wall 12 typically consists of studs 14 covered by a sheet material 16. In practice, a hole 18 is cut in the sheet material at the location where the louver 10 is to be installed.

The louver 10, which includes a circumferential sidewall 20 and a radially outwardly extending circumferential flange 22, is secured over the hole 18 by screws or nails (not shown) which extend through the flange 22. Slats 24 extending across the front of the sidewall 20 admit air through the louver and through the hole 18. A screen 26 which is adhered to the bottom of the flange 22 prevents insects and the like from entering the building. The louver 10, which can be blow molded from thin plastic (as shown) or can be formed from wood or other material, is entirely conventional.

After the louver 10 has been installed, it is normally covered either by siding (indicated at 28 in FIG. 3) or by brick (not shown). As discussed, the gaps 29 between the ends of the siding sections and the sidewall 20 of the louver must be suitably covered to prevent rain and snow from blowing in, and also for improved aesthetics.

Figure 1:
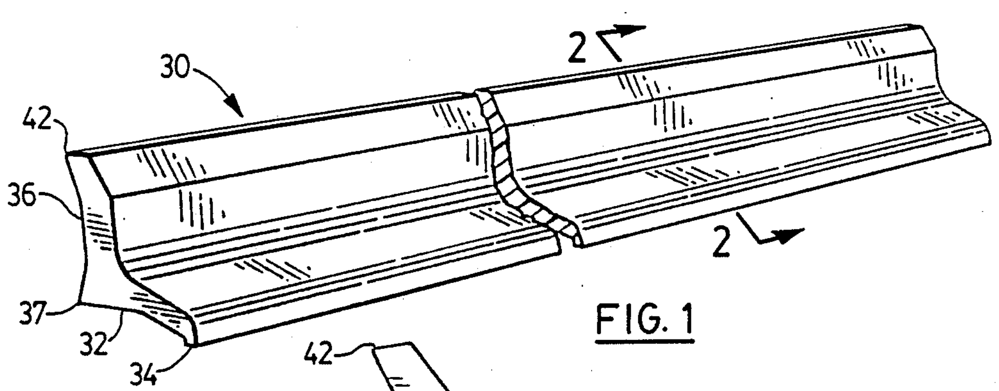
FIG. 1 is a prospective broken away view of a portion of a gasket according to the invention.
Figure 2:
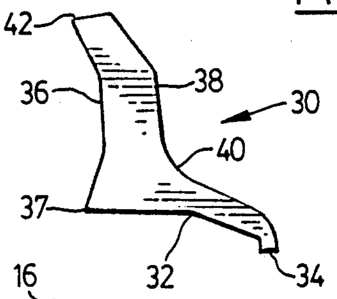
FIG. 2 is a cross-sectional view taken along lines 2—2 of the gasket of FIG. 1.
Figure 4:
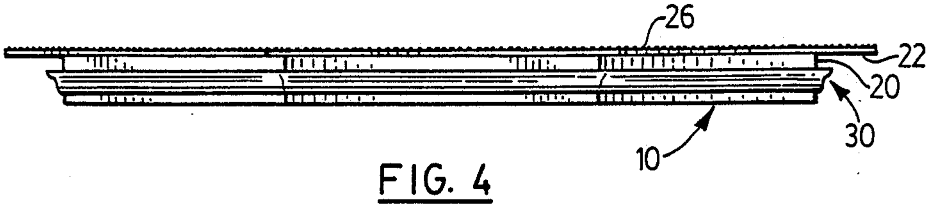
FIG. 4 is a side view of a ventilation louver with a gasket according to the invention thereon.
Figure 5:
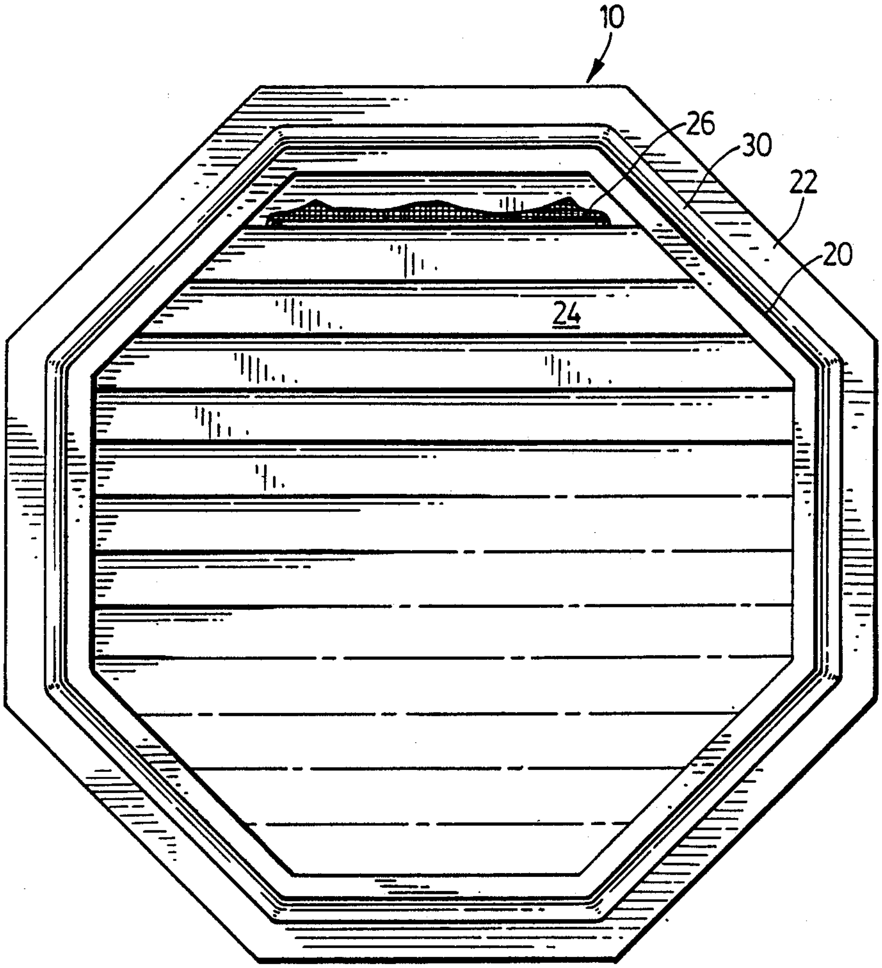
FIG. 5 is a plan view of the louver of FIG. 4.

According to the invention a gasket 30 is provided. The gasket 30 is formed in a closed loop (as shown in FIGS. 4 and 5) and has a cross-section as shown in FIGS. 1, 2 and 3. The gasket 30 is typically either molded or extrusion formed and has its ends bonded together by any suitable process. The gasket 30 is typically formed from a flexible, malleable but resilient plastic composition. For example the gasket 30 may be formed from polyvinyl chloride (to which appropriate softeners have been added, preferably non-migratory softeners which will not migrate into and soften the louver against which the gasket presses), polyetheylene, polypropelene, synthetic or natural rubber compounds, or polyurethane.

In cross-section the gasket 30 has a circumferential radially inwardly facing concave side surface 32 which presses against the sidewall 20 of the louver. The side surface 32 terminates in a narrow circumferential lip or flange 34 which extends radially inwardly of the gasket.

The gasket 30 also includes a circumferential rear concave surface 36 which in use is adapted to press against the siding 28. The rear surface 36 meets the side surface 32 at an inside corner 37 which defines an acute angle.

The gasket 30 also includes a front surface 38 having a center concave portion 40.

In use, the gasket 30 is made so that its interior circumference is slightly smaller than the exterior circumference of the ventilation louver sidewall 20. When the gasket 30 is installed, it is stretched over the sidewall 20 of the ventilation louver and presses tightly against the sidewall, in order to provide a reasonable seal against the sidewall. FIG. 3 shows the gasket 30 located off the ventilation louver and stretched slightly and in position to be applied to the louver. The dotted line position of FIG. 3 shows the gasket 30 after installation on the louver, and the full line position on the louver shows the rear surface 36 of the gasket pressed against the siding 28. The gasket 30 may be manually pushed between the various positions shown.

Since the gasket 30 is flexible, it deforms when it is pushed against the siding 28, causing its concave side surface 32 and its concave rear surface 36 to become flatter. When so deformed, the gasket attempts to regain its original shape. This forces the lip or flange 34 against the louver sidewall 20 helping to create a seal. It also presses the outside corner 42 of the rear surface 36 against the siding and presses the inside corner 37 into the gap 29, again helping to produce a reasonable degree of seal. At the same time, the curvature of the concave front surface portion 40 is increased. The reaction forces thus produced help to maintain some degree of seal against the louver sidewall 20 and the siding 28.

If brick instead of siding is used to cover the wall and to cover the flange 22 of the louver, then the gasket 30 can still be used but of course is then positioned closer to the top of the louver. Alternatively, the gasket 30 may simply be discarded (since it is relatively inexpensive) and instead mortar can be used to fill the spaces between the ends of the brick and the sidewall of the louver.

It will be appreciated that installation of the gasket 30 is much faster than cutting and attaching pieces of siding edge strip. Installation in confined areas does not present a problem since a tradesman need not use any special or awkward tools; instead the gasket can quickly be pushed into position using only the hands and minimal effort. In addition, the gasket 30 can accommodate a wide range of thicknesses of siding material and can provide at least some degree of seal in most cases. The shapes of the side and rear surfaces of the gasket also help the gasket to maintain its orientation as it is slid along the louver sidewall.

We claim:

1. A gasket for use with a ventilation louver of the kind having a base and a sidewall, said gasket having a body arranged in a closed polygonal loop with an open interior for receiving said louver, said body having a generally concave circumferential radially inwardly facing surface adapted to encircle and press against said sidewall of said louver, a generally concave circumferential rearwardly facing surface adapted to press against a construction material covering the base of said louver, and a circumferential front surface, said front surface being at least partly concave, said circumferential front surface and said circumferential radially inwardly facing surface meeting in a thin radially inwardly extending circumferential lip, said lip being adapted to press sealingly against said sidewall, said circumferential radially inwardly facing surface and said circumferential rearwardly facing surface meeting at an acute angle.

2. A louver gasket according to claim 1 and formed of a flexible resilient plastic material.

3. A louver gasket according to claim 1 wherein said closed polygonal loop is selected from the shapes consisting of round, semi-circular, hexagonal and rectangular.

4. In combination, a ventilation louver comprising a polygonal sidewall having a bottom and a top, a flange extending radially outwardly from the bottom of said sidewall and encircling said sidewall, a set of louver slats extending across the top of said sidewall, and a gasket fitted on and encircling said sidewall, said gasket normally being of circumference slightly less than that of said sidewall and thereby exerting tension against and being fitted snugly on said sidewall, said gasket having a generally concave circumferential radially inwardly facing surface facing and pressing against said sidewall and having a generally concave circumferential rearwardly facing surface adapted to press against a construction material covering said flange of said louver, said circumferential radially inwardly facing surface and said circumferential rearwardly facing surface meeting at an acute angle, so that when said flange is covered by said construction material, said gasket may be pushed rearwardly over said sidewall of said louver to a position in which said rear surface presses against said construction material.

5. The combination according to claim 4 wherein said gasket has a circumferential front partly concave surface.

6. The combination according to claim 5 wherein said circumferential front surface and said circumferential radially inwardly facing surface define between them a narrow radially inwardly extending circumferential lip which presses against said sidewall of said louver to provide a degree of seal against said louver.

7. The combination according to claim 4 wherein said polygonal sidewall is selected from the shapes consisting of round, semi-circular, hexagonal and rectangular.

* * * * *